United States Patent
Gava

(10) Patent No.: US 7,639,807 B2
(45) Date of Patent: Dec. 29, 2009

(54) SYSTEM AND METHOD FOR ENCRYPTION OF IMAGE DATA IN A NETWORKED ENVIRONMENT

(75) Inventor: Fabio M. Gava, Irvine, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 858 days.

(21) Appl. No.: 10/949,052

(22) Filed: Sep. 24, 2004

(65) Prior Publication Data

US 2006/0072749 A1 Apr. 6, 2006

(51) Int. Cl.
*H04N 1/44* (2006.01)
*H04N 1/00* (2006.01)
(52) U.S. Cl. ...................... 380/243; 715/248
(58) Field of Classification Search ............. 358/434; 713/155, 165, 179; 380/44, 243, 246
See application file for complete search history.

(56) References Cited

U.S. PATENT DOCUMENTS

| | | | | |
|---|---|---|---|---|
| 6,378,070 | B1 * | 4/2002 | Chan et al. ............... 713/155 |
| 6,542,261 | B1 * | 4/2003 | McGraw ................... 358/434 |
| 6,880,091 | B1 * | 4/2005 | Mattis et al. ............... 726/5 |
| 7,325,052 | B1 * | 1/2008 | Motoyama ................ 709/223 |
| 2003/0081234 | A1 | 5/2003 | Wiley |
| 2003/0145218 | A1 * | 7/2003 | Hutchison ................ 713/200 |
| 2003/0182475 | A1 | 9/2003 | Gimenez |
| 2004/0064704 | A1 | 4/2004 | Rahman |
| 2004/0125402 | A1 | 7/2004 | Kanai et al. |
| 2004/0165723 | A1 * | 8/2004 | Yoda et al. ............... 380/44 |
| 2005/0210259 | A1 * | 9/2005 | Richardson ............... 713/179 |
| 2005/0262340 | A1 * | 11/2005 | Rabb ...................... 713/165 |

* cited by examiner

*Primary Examiner*—Ponnoreay Pich
(74) *Attorney, Agent, or Firm*—Tucker Ellis & West LLP

(57) ABSTRACT

This invention is directed to a system and method for the encryption of image data in a networked environment. More particularly, this invention is directed to a system and method for encrypting documents or data generated via an associated image generating device.

12 Claims, 4 Drawing Sheets

SYSTEM AND METHOD FOR ENCRYPTION OF IMAGE DATA IN A NETWORKED ENVIRONMENT

BACKGROUND OF THE INVENTION

This invention is directed to a system and method for the encryption of image data in a networked environment. More particularly, this invention is directed to a system and method for encrypting documents or data generated via an associated image generating device.

Often in an office environment, personnel will need to digitize documents. Digitization may be for transmission, such as via electronic mail attachment, for archiving, reproduction, or electronic alteration. Many times, such document will contain sensitive information. In earlier systems a resultant electronic document or image would be placed on a publicly accessible storage device where it would be accessible to others to view or copy.

A user will typically use an image generating device or multifunctional peripheral to scan documents and generate image data in a selected format, such as TIFF or PDF file formats. Once generated, the TIFF or PDF file containing the image data may be stored onto a local or network file, or transferred to an FTP server, an electronic mail server, or other network device. However, the file containing the image data is not encrypted and does not have any security features to prevent unauthorized access to such file. Any user with access to the file would be able to see the contents of the file.

The subject inventions solves the aforementioned problems and provides a system and method for the encryption of image data in a networked environment.

SUMMARY OF THE INVENTION

In accordance with the present invention, there is provided a system and method for encryption of image data in a networked environment.

Further, in accordance with the present invention, there is provided a system and method which encrypts image data and prevents unauthorized access to the image data.

Further, in accordance with the present invention, there is provided a system and method wherein generated image data is converted to a password protected file format prior to transferring the file to a selected destination.

Still further, in accordance with the present invention, there is provided a system for encryption of image data in a networked environment. The system comprises means adapted for receiving electronic document data from an associated image generating device and means adapted for receiving, from an associated user, password data associated with the received electronic document data. The system also comprises encryption means adapted for encrypting the electronic document data in accordance with the password data and means adapted for communicating encrypted electronic data to a selected network device via an associated data network.

Preferably, the system comprises an image generating device for generating the electronic document data. The image generating device includes a facsimile device, a scanning device, a copying device, an optical character recognition device, and a multifunctional peripheral device.

In a preferred embodiment, the selected network device includes a data storage device. Preferably the data storage device includes an FTP server and an electronic mail server.

In a preferred embodiment, the password data forms an encryption key for the encrypting of the electronic data. In a preferred embodiment, the system also includes means adapted for converting the image data to a selected format prior to communicating the encrypted electronic data to the selected network device.

Still further, in accordance with the present invention, there is provided a method for encryption of image data in a networked environment. The method comprises the steps of receiving electronic document data from an associated image generating device and receiving, from an associated user, password data associated with the received electronic document data. The method also comprises the steps of encrypting the electronic document data in accordance with the password data and communicating encrypted electronic data to a selected network device via an associated data network.

Preferably, the method further comprises the step of generating the image data via an associated image generating device. The image generating device includes a facsimile device, a scanning device, a copying device, an optical character recognition device, and a multifunctional peripheral device.

In a preferred embodiment, the selected network device includes a data storage device. Preferably the data storage device includes an FTP server and an electronic mail server.

In a preferred embodiment, the password data forms an encryption key for the encrypting of the electronic data. In a preferred embodiment, the method also includes the step of converting the image data to a selected format prior to communicating the encrypted electronic data to the selected network device.

These and other aspects, advantages, and features of the present invention will be understood by one of ordinary skill in the art upon reading and understanding the specification.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

Figure 1:
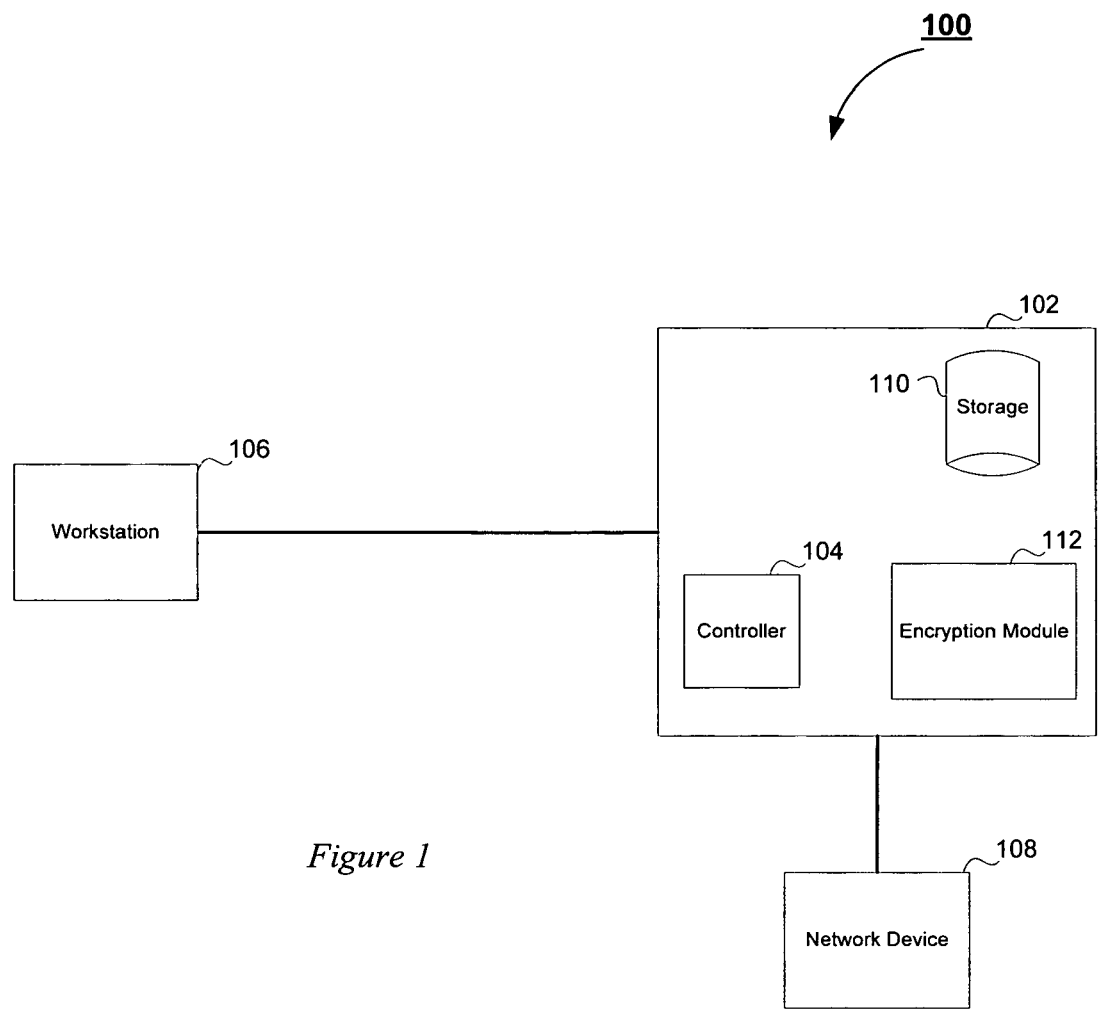
FIG. 1 is a block diagram illustrative of the system of the present invention.

The present invention is directed to a system and method for transferring image data from a document reading device to a plurality of agents. FIG. 1 shows a block diagram preferred embodiment of the system according to the present invention generally designated as 100. The system comprises an image generating device 102, such as a scanner or copier, for generating image data. The image generating device is any suitable document reading device known in the art. Preferably, the image generating device is a scanning device, a copying device, a facsimile device, or a multifunctional peripheral device. More preferably, the image generating device is a scanning device. Suitable commercially available image generating devices include, but are not limited to, the Toshiba e-Studio Series Controller. The image generating device further comprises a controller 104 which controls the functions of the image generating device.

The image generating device includes means adapted for receiving the document or other data from an associated user to be generated. Such means include, but are not limited to, receiving the image data from workstation 106 in data communication with the image generating device, scanning the document or data at the image generating device, and the like. The image generating device also includes means adapted for transferring the generated image data to at least one network device shown as 108 via any suitable means, such as a data communications link. Such network devices include, but are not limited to, an FTP server, an electronic mail server, an image generating device, or a storage medium. The generated image data is also able to be transferred to a local storage medium in the image generating device shown as 110 for local storage.

The system includes means adapted for receiving information or data from the associated user relating to the generation and encryption of the generated image data. Such means include, but are not limited to, receive the data from workstation 106 via a data communications link or via a user interface associated with or connected to the image generating device. The user provides information, such as the user name, the password, the desired file format for the encryption, parameters for the image generation, desired network device that the encrypted data is to be transmitted, and the like.

The system further includes means adapted for encrypting the image data. The image data is encrypted via any suitable means known in the art. By way of example, such encryption means include Riverst-Shamir-Adelman (RSA), Diffie-Hellman, Digital Signature Standard (DSS), EIGamal, LUC, DES, Blowfish, International Data Encryption Algorithm (IDEA), RC4, SAFER, and Enigma. The encryption means are suitably associated with the image generating device or a separate component as shown at 112.

Figure 2:
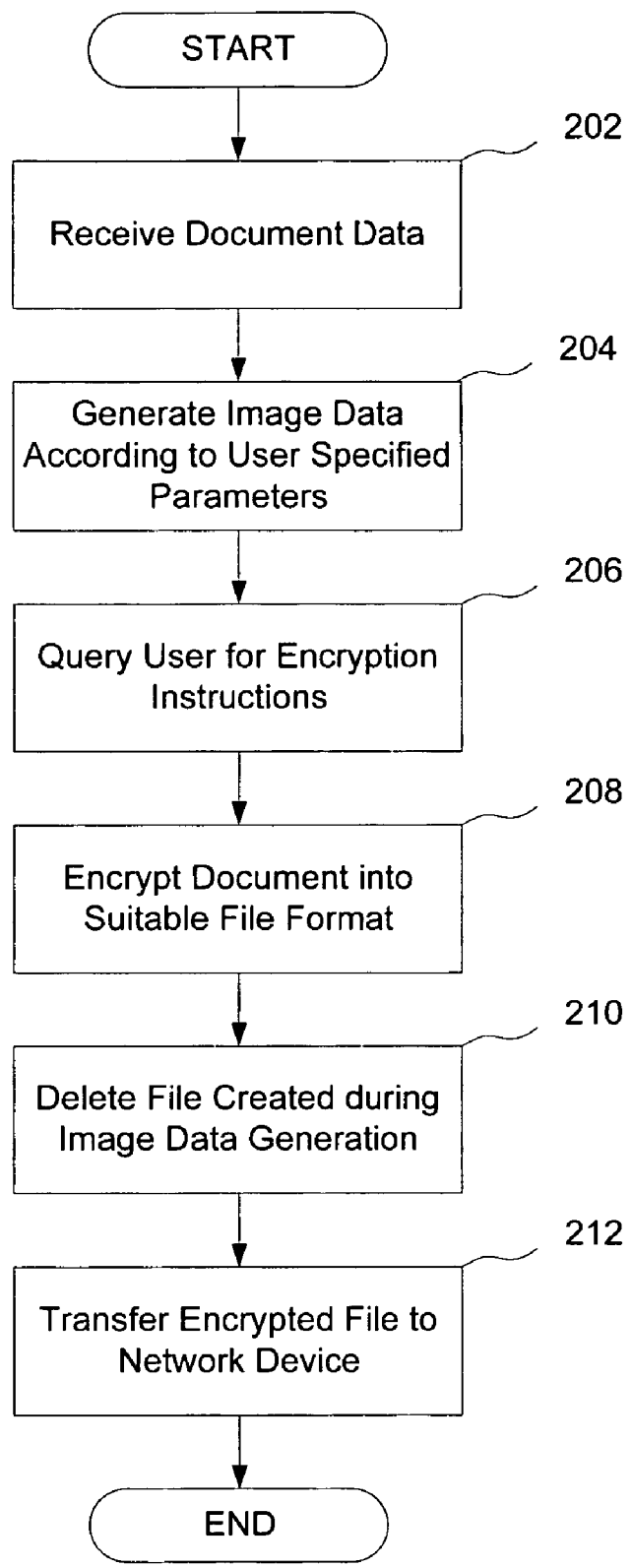
FIG. 2 is a flow chart illustrating the operation of the present invention.

FIG. 2 is a flowchart illustrating the method according to the present invention. At 202, the document or data is received from the user as described above. At 204, the image data is generated according to any parameters as specified by the user. Preferably the image data is generated in a TIFF or PDF format. Such format is preferably specified by the user via any suitable means.

Figure 3:
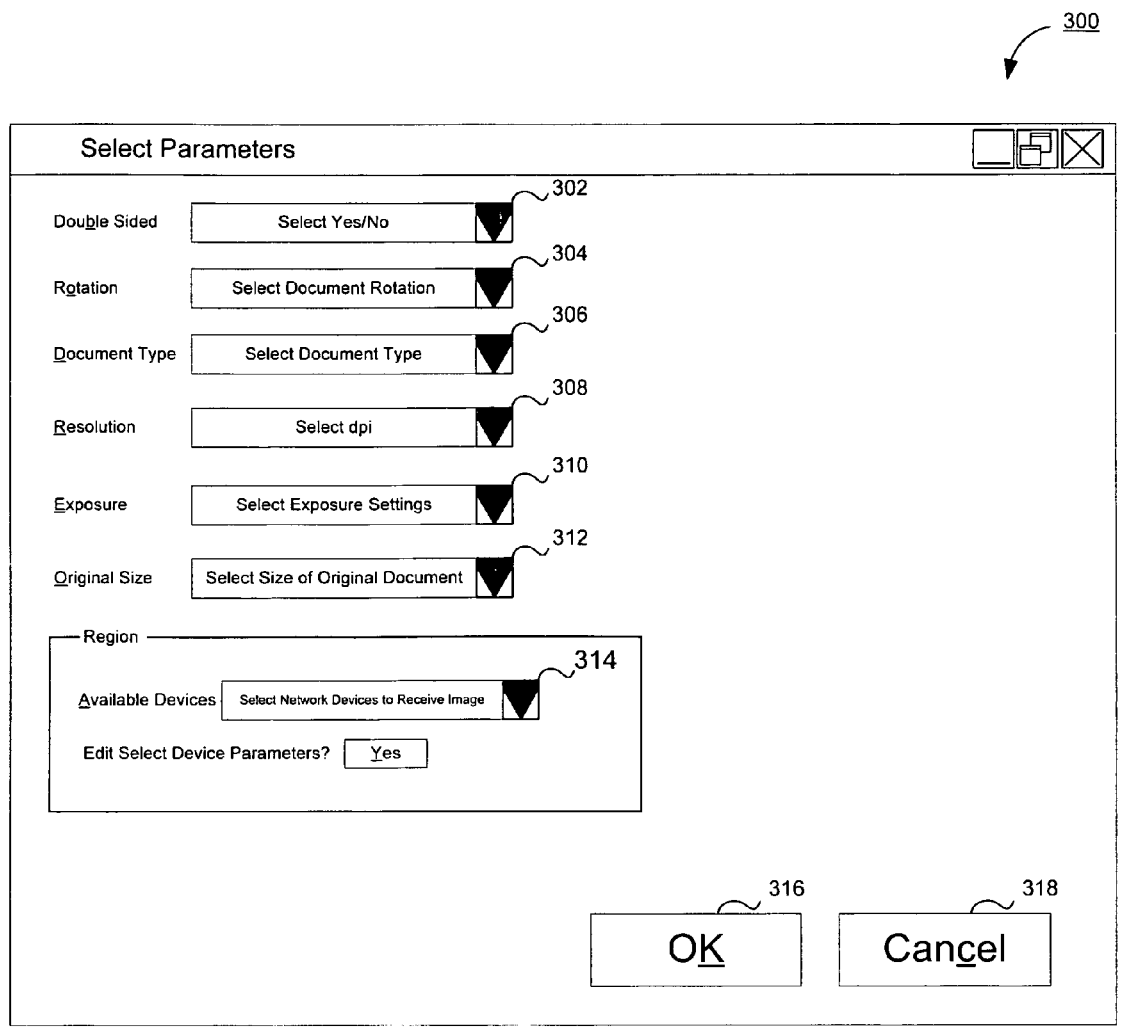
FIG. 3 is a sample template for selecting the parameters for the image generation.

FIG. 3 shows a sample template 300 for selecting the parameters for the image generation and the selected network device to which the image data is transmitted. The user selects whether it is a double-sided scan image at 302. The user then specifies the rotation at 304, the document type at 306, the resolution at 308, the exposure at 310, and the size of the original at 312. The region specified at 314 shows the various network devices which are able to receive image data from the image generating device. The user selects the desired devices and provides the parameters for transferring the image data to such device. The user can then select the OK button 316 to save the setting or the Cancel button 318 to cancel the settings entered.

At 206, the user is requested to provide information regarding the encryption of the image data via any suitable means. Such information includes at least the password required to access the encrypted data and preferably, the user name and any other related information.

Figure 4:
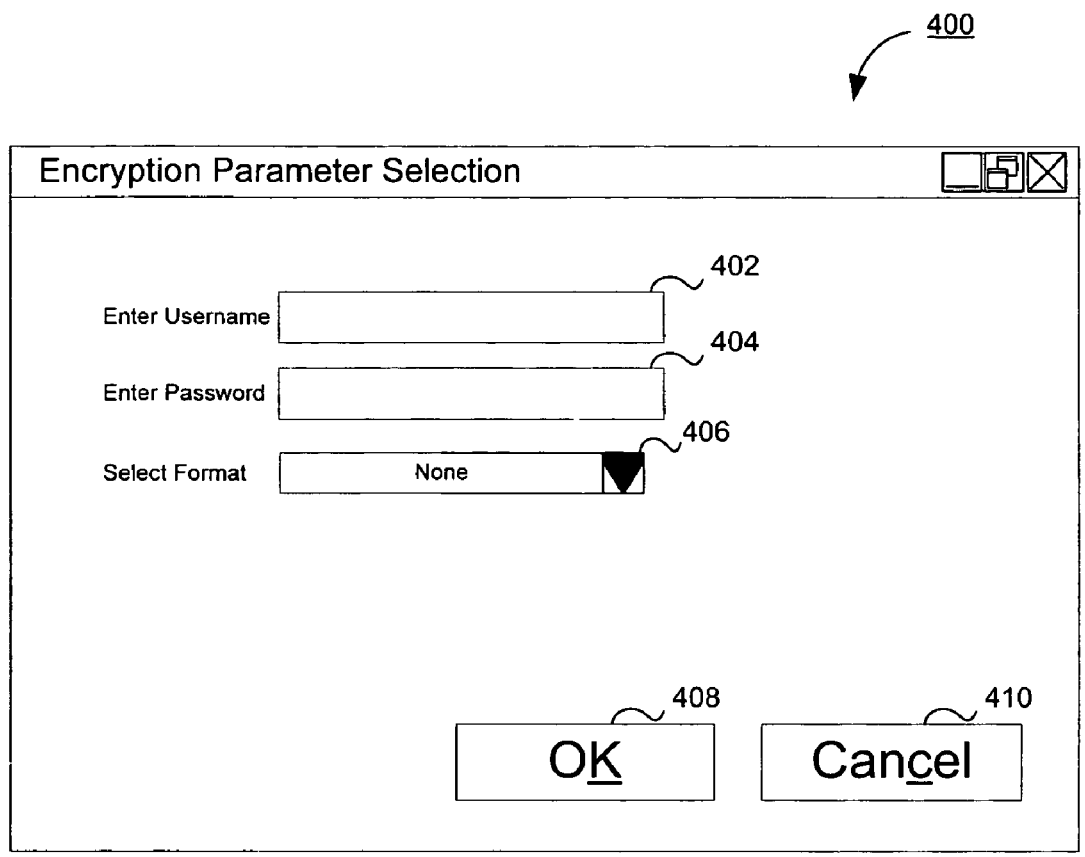
FIG. 4 is a sample template for selecting the desired settings for encryption of the image data.

FIG. 4 shows a sample template 400 for providing the information relating to encrypting the document or data. At 402, the user provides the user name. At 404, the user enters the desired password. At 406, the user enters the desired format for the encrypted file. In another embodiment, a default file format is selected for the encrypted file by the system administrator or the like and the user is not allowed to select or change the file format. The user saves the selections by selecting the OK button 408. The user cancels the selections by selecting the Cancel button 410.

At 208, document or data is encrypted via any suitable names using the password as selected by the user into a suitable file format. The file format is preferably a zip file. At 210, the TIFF or PDF file created when the image data was generated is deleted. At 212, the encrypted file is transferred to the selected network device as specified by the user.

As one skilled in the art can readily appreciate the present invention may be implemented in a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A system for encryption of image data in a network environment comprising:

a scanner operable to scan a tangible document to generate electronic document data corresponding to an image thereof;

means for receiving a template comprised of document output settings corresponding to desired document output properties, encryption format, and network storage destination for the electronic document data;

means for receiving the electronic document data from the scanner into a local non-volatile data storage;

means for receiving, from an associated user, username data and password data associated with the received electronic data;

means for converting received electronic data in accordance with received document output settings to a compressed electronic document encoded in a selected, standardized electronic document format;

encryption means, via a controller of an associated image generating device, for encrypting the compressed electronic document in accordance with the password data to form an encrypted electronic document which is decryptable in accordance with the username data and the password data;

means for deleting the electronic document data from the local non-volatile storage after encryption thereof;

means for storing the encrypted electronic document in the local non-volatile storage;

means for communicating the encrypted electronic document to a selected network device via a data communications link via an associated data network; and means for deleting the encrypted electronic document from the local non-volatile storage after communication to the selected network device.

2. The system for encryption of image data in a network environment of claim 1 wherein the selected network device includes a data storage device.

3. The system for encryption of image data in a network environment of claim 1 wherein the password data forms an encryption key for the encrypting of the electronic data.

4. The system for encryption of image data in a network environment of claim 2 wherein the data storage device includes at least one of an FTP server and an electronic mail server.

5. A method for encryption of image data in a network environment comprising the steps of:
- generating electronic document data via a scan by an associated scanner of a tangible document;
- receiving a template comprised of document output settings corresponding to desired document output properties, encryption format, and network storage destination for the electronic document data;
- receiving the electronic document data from the scanner into a local non-volatile data storage;
- receiving, from an associated user, username data and password data associated with the received electronic data;
- converting received electronic data in accordance with received document output settings to a compressed electronic document encoded in a selected, standardized electronic document format;
- encrypting the compressed electronic document in accordance with the password data to form an encrypted electronic document which is decryptable in accordance with the username data and the password data;
- deleting the electronic document data from the local non-volatile storage after encryption thereof;
- storing the encrypted electronic document in the local non-volatile storage;
- communicating the encrypted electronic document to a selected network device via a data communications link via an associated data network; and
- deleting the encrypted electronic document from the local non-volatile storage after communication to the selected network device.

6. The method for encryption of image data in a network environment of claim 5 wherein the password data forms an encryption key for the encrypting of the electronic data.

7. The method for encryption of image data in a network environment of claim 5 wherein the selected network device includes a data storage device.

8. The method for encryption of image data in a network environment of claim 7 wherein the data storage device includes at least one of an FTP server and an electronic mail server.

9. A computer-readable medium comprising instructions for encryption of image data in a network environment comprising:
- instructions for generating electronic document data via a scan by an associated scanner of a tangible document;
- instructions for receiving a template comprised of document output settings corresponding to desired document output properties, encryption format, and network storage destination for the electronic document data;
- instructions for receiving the electronic document data from the scanner into a local non-volatile data storage;
- instructions for receiving, from an associated user, username data and password data associated with the received electronic data;
- instructions for converting received electronic data in accordance with received document output settings to a compressed electronic document encoded in a selected, standardized electronic document format;
- instructions for encrypting the compressed electronic document in accordance with the password data to form an encrypted electronic document which is decryptable in accordance with the username data and the password data;
- instructions for deleting the electronic document data from the local non-volatile storage after encryption thereof;
- instructions for storing the encrypted electronic document in the local non-volatile storage;
- instructions for communicating the encrypted electronic document to a selected network device via a data communications link via an associated data network; and
- instructions for deleting the encrypted electronic document from the local non-volatile storage after communication to the selected network device.

10. The computer-readable medium for encryption of image data in a network environment of claim 9 wherein the password data forms an encryption key for the encrypting of the electronic data.

11. The computer-readable medium for encryption of image data in a network environment of claim 9 wherein the selected network device includes a data storage device.

12. The computer-readable medium for encryption of image data in a network environment of claim 11 wherein the data storage device includes at least one of an FTP server and an electronic mail server.

* * * * *